(12) United States Patent
Cheng et al.

(10) Patent No.: US 10,048,701 B2
(45) Date of Patent: Aug. 14, 2018

(54) DYNAMIC LINEAR CONTROL METHODS AND APPARATUS FOR VARIABLE SPEED PUMP CONTROL

(71) Applicant: Fluid Handling LLC, Morton Grove, IL (US)

(72) Inventors: Andrew A. Cheng, Wilmette, IL (US); James J. Gu, Buffalo Grove, IL (US); Graham A. Scott, Prospect Heights, IL (US)

(73) Assignee: Fluid Handling LLC, Morton Grove, IL (US)

( * ) Notice: Subject to any disclaimer, the term of this patent is extended or adjusted under 35 U.S.C. 154(b) by 545 days.

(21) Appl. No.: 13/717,086

(22) Filed: Dec. 17, 2012

(65) Prior Publication Data

US 2014/0005841 A1 Jan. 2, 2014

Related U.S. Application Data

(60) Provisional application No. 61/576,737, filed on Dec. 16, 2011.

(51) Int. Cl.
*G06F 19/00* (2018.01)
*G05D 7/06* (2006.01)
*F04D 15/00* (2006.01)

(52) U.S. Cl.
CPC ....... *G05D 7/0617* (2013.01); *F04D 15/0066* (2013.01)

(58) Field of Classification Search
USPC .......... 700/282, 275, 295; 236/78 D; 62/230
See application file for complete search history.

(56) References Cited

U.S. PATENT DOCUMENTS

| | | | |
|---|---|---|---|
| 4,490,094 A | 12/1984 | Gibbs | |
| 4,708,594 A | 11/1987 | Shinmei et al. | |
| 4,897,798 A | 6/1990 | Cler | |
| 5,069,792 A | 12/1991 | Prince et al. | |
| 5,318,409 A | 6/1994 | London et al. | |

(Continued)

FOREIGN PATENT DOCUMENTS

| | | |
|---|---|---|
| DE | 102007022348 | 11/2008 |
| EP | 726396 | 8/1996 |

(Continued)

OTHER PUBLICATIONS

JP56096189 English Language Abstract (1 page) dated Aug. 4, 1981.

(Continued)

*Primary Examiner* — Kidest Bahta
(74) *Attorney, Agent, or Firm* — Ware, Fressola, Maguire & Barber LLP

(57) ABSTRACT

Apparatus, such as a pump controller, features a signal processor configured at least to: receive signaling containing information about a linear set point control curve based at least partly on an adaptive set point control curve related to fluid being pumped by a pump in a pumping system, and determine a control set point based at least partly on the signaling received. The signal processor may be configured to provide a control signal containing information to control the pump based on the control set point determined.

24 Claims, 5 Drawing Sheets

A control set point obtained from a linear set point curve derived from the adaptive and constant control curve.

(56) References Cited

U.S. PATENT DOCUMENTS

| | | |
|---|---|---|
| 5,555,749 A | 9/1996 | Wehrman et al. |
| 5,615,996 A | 4/1997 | Suzuki et al. |
| 5,651,264 A | 7/1997 | Lo et al. |
| 5,657,264 A * | 8/1997 | Yamauchi et al. ......... 365/49.11 |
| 5,817,950 A | 10/1998 | Wiklund et al. |
| 5,911,238 A | 6/1999 | Bump et al. |
| 5,991,525 A | 11/1999 | Shah et al. |
| 5,997,778 A | 12/1999 | Bulgrin |
| 6,114,670 A | 9/2000 | Erickson et al. |
| 6,142,228 A | 11/2000 | Jogi et al. |
| 6,145,228 A | 11/2000 | Jogi et al. |
| 6,234,759 B1 | 5/2001 | Hennel et al. |
| 6,241,485 B1 | 6/2001 | Warwick |
| 6,293,901 B1 * | 9/2001 | Prem .................... A61M 1/101 600/16 |
| 6,324,490 B1 | 11/2001 | Johansson et al. |
| 6,332,463 B1 | 12/2001 | Farrugia et al. |
| 6,350,105 B1 | 2/2002 | Kobayashi et al. |
| 6,455,316 B1 * | 9/2002 | Turner .............. B01F 15/00207 374/E13.001 |
| 6,532,423 B2 | 3/2003 | Chen et al. |
| 6,663,349 B1 | 12/2003 | Discenzo et al. |
| 6,725,167 B2 | 4/2004 | Grumstrup et al. |
| 6,758,655 B2 | 7/2004 | Sacher |
| 6,775,595 B1 | 8/2004 | Yabutani et al. |
| 6,862,405 B2 | 3/2005 | Malinoski et al. |
| 6,939,109 B2 | 9/2005 | Takahashi et al. |
| 7,033,147 B2 | 4/2006 | Yanai et al. |
| 7,036,559 B2 † | 5/2006 | Stanimirovic |
| 7,082,374 B2 | 7/2006 | Ranta |
| 7,143,016 B1 * | 11/2006 | Discenzo .......... G05B 13/0265 703/3 |
| 7,163,001 B2 | 1/2007 | Jung et al. |
| 7,261,167 B2 | 8/2007 | Goldman et al. |
| 7,267,086 B2 | 9/2007 | Allen et al. |
| 7,336,168 B2 | 2/2008 | Kates |
| 7,341,201 B2 † | 3/2008 | Stanimirovic |
| 7,396,327 B2 | 7/2008 | Morello |
| 7,455,099 B2 | 11/2008 | Osborn et al. |
| 7,552,033 B1 | 6/2009 | Culp et al. |
| 7,558,699 B2 | 7/2009 | Beck et al. |
| 7,630,580 B1 | 12/2009 | Repenning |
| 7,668,694 B2 | 2/2010 | Anderson et al. |
| 7,720,574 B1 | 5/2010 | Roys |
| 7,734,441 B2 | 6/2010 | Taravat et al. |
| 7,845,913 B2 | 12/2010 | Stiles, Jr. et al. |
| 7,896,105 B2 | 3/2011 | Dupriest |
| 7,945,411 B2 | 5/2011 | Kernan et al. |
| 8,024,161 B2 | 9/2011 | Pekar et al. |
| 8,065,110 B2 | 11/2011 | Golinveaux et al. |
| 8,690,820 B2 * | 4/2014 | Cinar ................ A61B 5/14532 600/319 |
| 8,774,972 B2 * | 7/2014 | Rusnak ............... F04D 15/0066 415/122.1 |
| 8,833,384 B2 * | 9/2014 | Burt ................ F24F 11/008 137/487.5 |
| 9,328,727 B2 * | 5/2016 | Koehl ................ F04D 15/0088 |
| 2001/0025146 A1 | 9/2001 | Maloney et al. |
| 2002/0099677 A1 * | 7/2002 | Calise ................ G05B 13/027 706/23 |
| 2003/0047008 A1 * | 3/2003 | Gopalakrishnan ........ G01F 1/34 73/861.79 |
| 2003/0057904 A1 | 3/2003 | Sacher |
| 2003/0063978 A1 | 4/2003 | Takahashi et al. |
| 2003/0157721 A1 * | 8/2003 | Turner .............. B01F 15/00201 436/148 |
| 2004/0013531 A1 | 1/2004 | Curry et al. |
| 2005/0006488 A1 * | 1/2005 | Stanimirovic ............... 236/49.1 |
| 2005/0025628 A1 | 2/2005 | Jones |
| 2005/0105471 A1 | 5/2005 | Ido et al. |
| 2005/0123408 A1 | 6/2005 | Koehl |
| 2005/0125104 A1 | 6/2005 | Wilson et al. |
| 2005/0133211 A1 | 6/2005 | Osborn et al. |
| 2006/0095163 A1 | 5/2006 | Wear et al. |
| 2007/0028632 A1 | 2/2007 | Liu |
| 2007/0065304 A1 | 3/2007 | Meloche et al. |
| 2007/0288103 A1 | 12/2007 | Choudhury et al. |
| 2008/0187443 A1 | 8/2008 | Aguilar et al. |
| 2008/0288115 A1 * | 11/2008 | Rusnak ............... F04D 15/0066 700/282 |
| 2009/0094173 A1 | 4/2009 | Smith et al. |
| 2009/0129935 A1 | 5/2009 | Kunkler et al. |
| 2009/0129941 A1 | 5/2009 | Haas |
| 2009/0132458 A1 | 5/2009 | Edwards et al. |
| 2009/0171512 A1 * | 7/2009 | Duncan .................... 700/300 |
| 2009/0234289 A1 | 9/2009 | Gagel et al. |
| 2009/0281671 A1 | 11/2009 | Duan et al. |
| 2010/0010681 A1 | 1/2010 | Zugibe et al. |
| 2010/0028171 A1 | 2/2010 | Shulver et al. |
| 2010/0140934 A1 | 6/2010 | Nicoson |
| 2010/0150737 A1 | 6/2010 | Anderson et al. |
| 2010/0319697 A1 | 12/2010 | Farrugia et al. |
| 2011/0022236 A1 | 1/2011 | Higgins |
| 2011/0032527 A1 | 2/2011 | Chan |
| 2011/0081255 A1 | 4/2011 | Steger et al. |
| 2011/0106452 A1 | 5/2011 | Anderson et al. |
| 2011/0153237 A1 | 6/2011 | Jonsson et al. |
| 2011/0206537 A1 | 8/2011 | Simpson |
| 2011/0255992 A1 | 10/2011 | Tran et al. |
| 2011/0301766 A1 | 12/2011 | Higgins et al. |
| 2011/0301776 A1 * | 12/2011 | Goyal et al. .................. 700/296 |
| 2012/0173027 A1 | 7/2012 | Cheng et al. |

FOREIGN PATENT DOCUMENTS

| | | |
|---|---|---|
| EP | 1323986 | 7/2003 |
| JP | 56096189 | 8/1981 |
| WO | 8602858 | 5/1986 |
| WO | 9200769 | 1/1992 |
| WO | 9910783 | 3/1999 |
| WO | 2005115539 | 12/2005 |
| WO | 2012092055 | 7/2012 |

OTHER PUBLICATIONS

Abstract for EP1761306 not available, Abstract for corresponding US2005267322 attached , 2004.

WO 2008138520 A1 corresponding to DE 2007 022 348 A1.

\* cited by examiner
† cited by third party

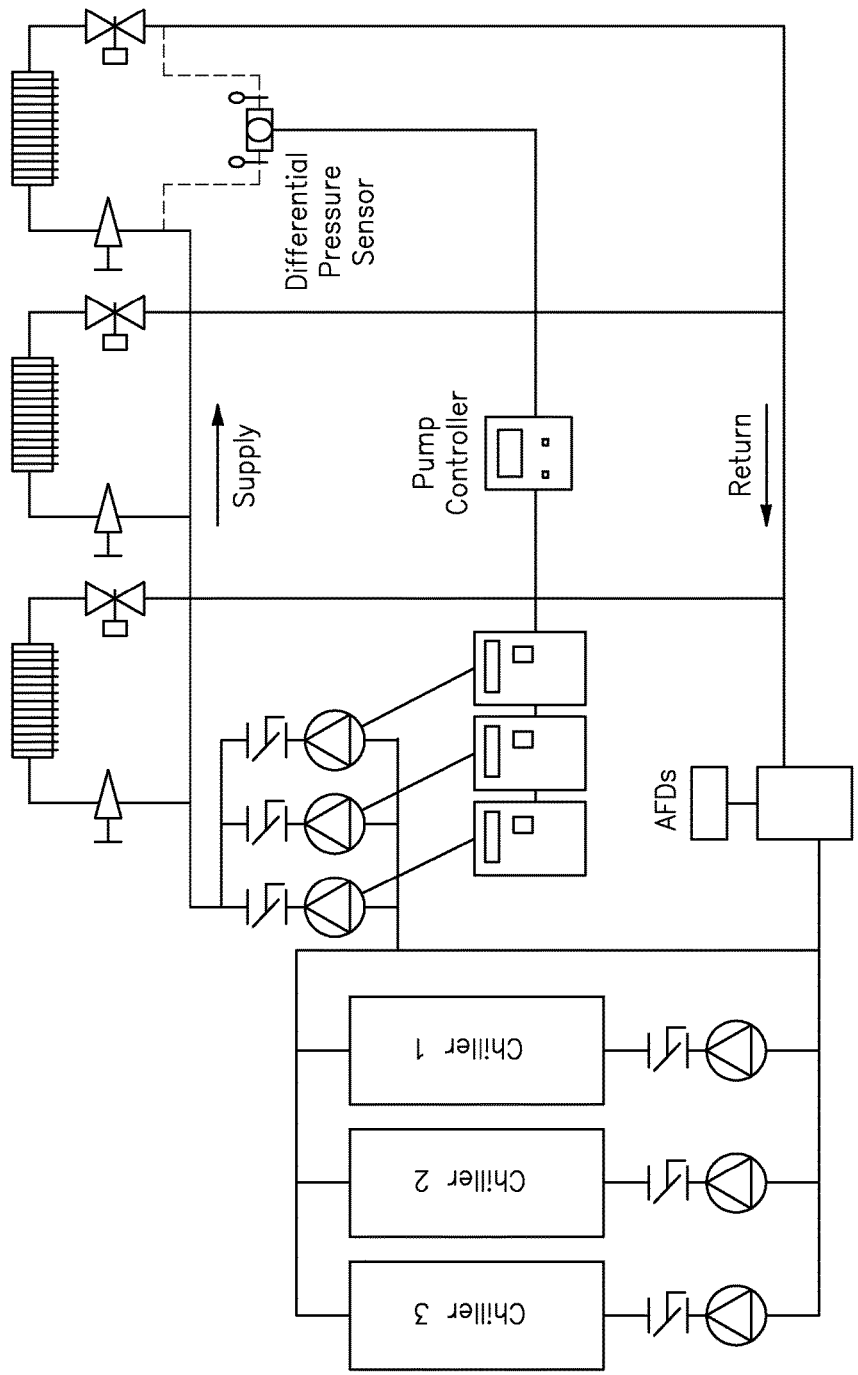
*FIG. 1(a):* (Prior Art) A secondary variable speed pump control hydronic heating or cooling system

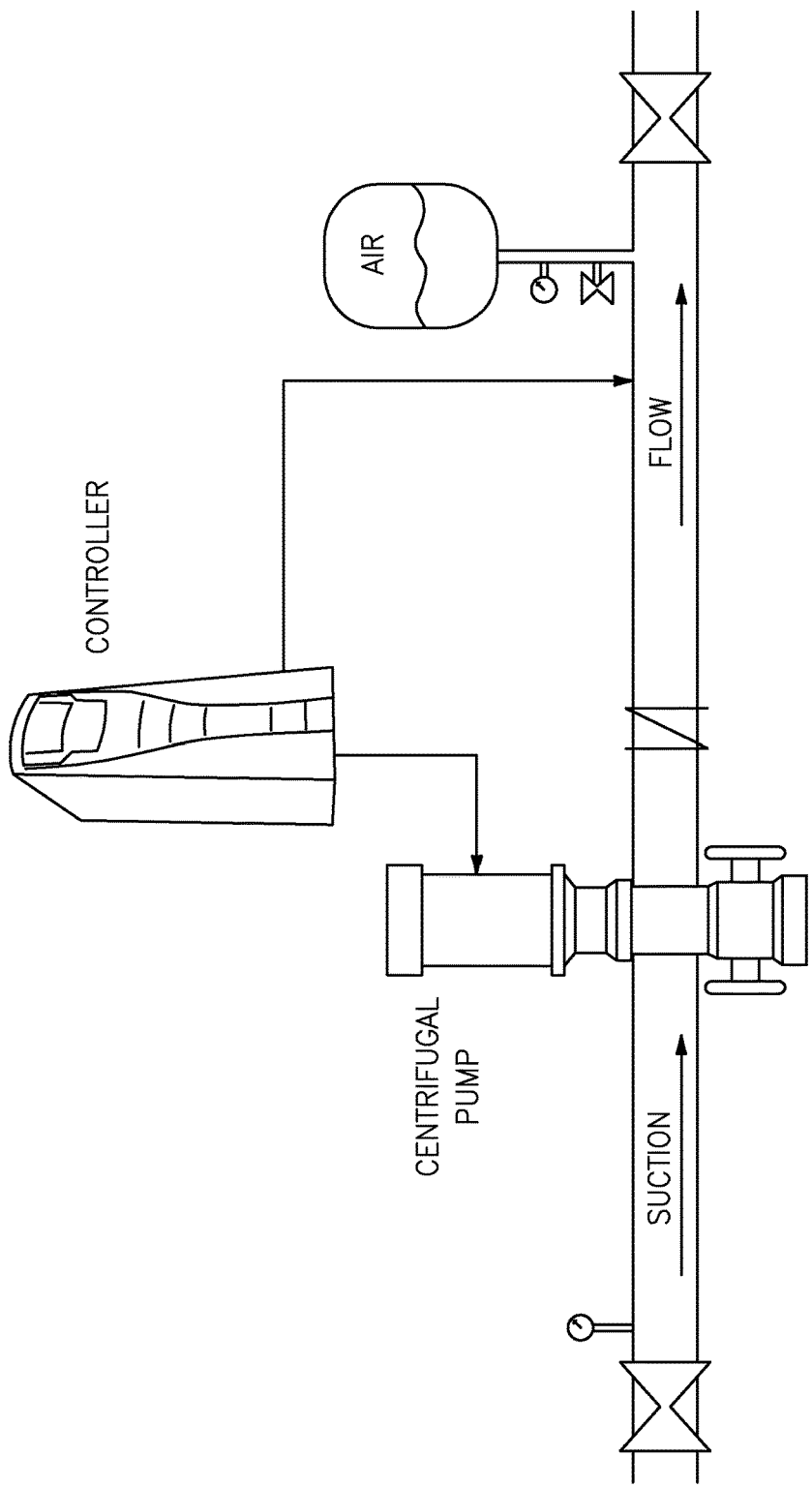
FIG. 1(b): (Prior Art) A water booster pumping system

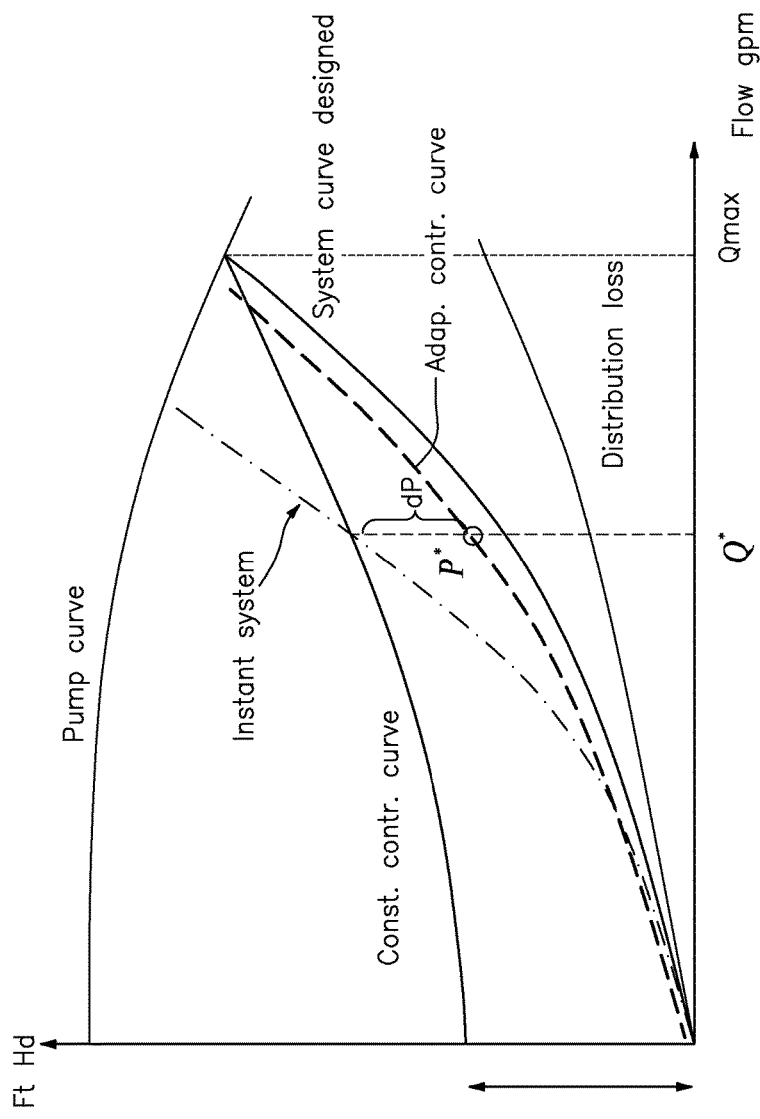
FIG. 1(c): (Prior Art) An adaptive control approach in which the hydronic power saved = $dP*Q*$ at a flow rate of $Q*$ Apparatus, 10

A signal processor 12 configured to:

receive signaling containing information about a linear set point control curve based at least partly on an adaptive set point control curve related to fluid being pumped by a pump in a pumping system, determine a control set point based at least partly on the signaling receive, and/or provide a control signal containing information to control the pump based at least partly on the control set point determined.

Other signal processor circuits or components 14 that do not form part of the underlying invention, e.g., input/output modules, one or more memory modules, data, address and control busing architecture, etc.

*FIG. 2*

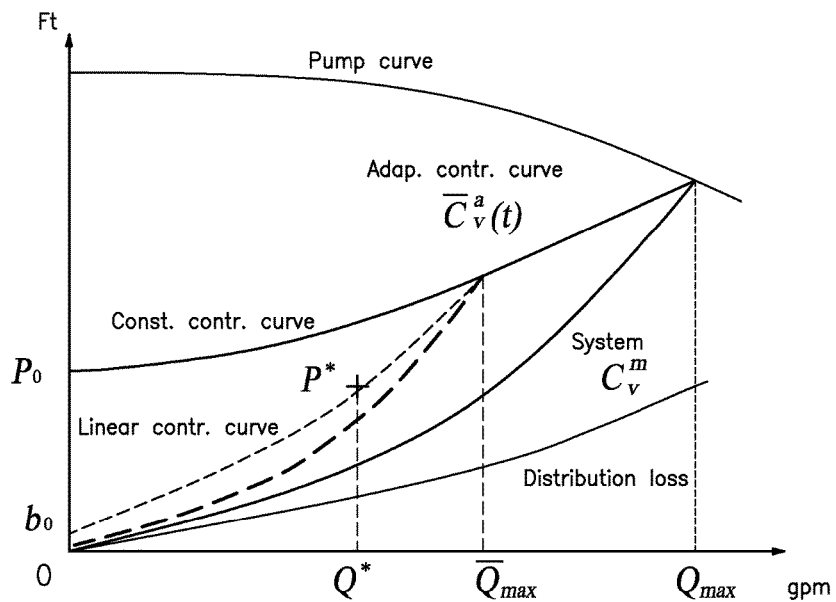
FIG. 3: A control set point obtained from a linear set point curve derived from the adaptive and constant control curve.
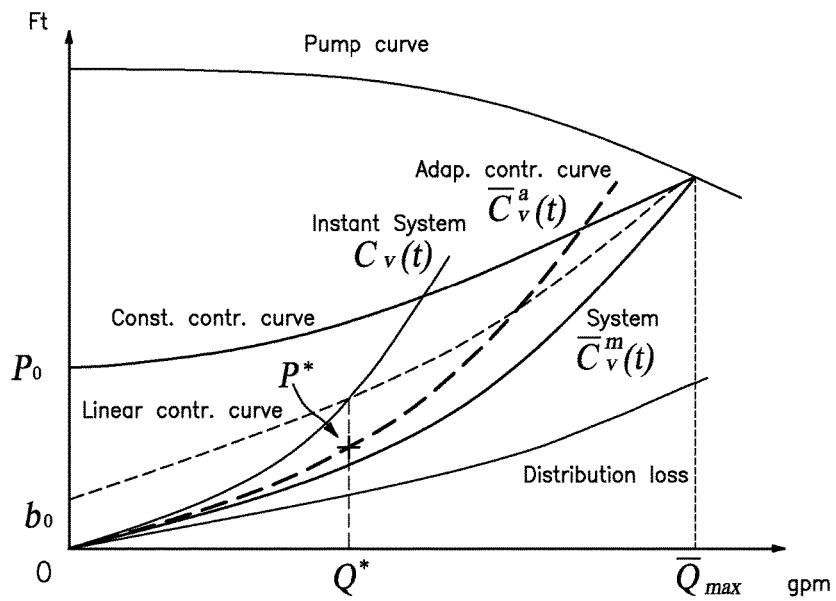
FIG. 4: A prefered linear adaptive control approach with the request flow $Q^*$ calculated specifically.

DYNAMIC LINEAR CONTROL METHODS AND APPARATUS FOR VARIABLE SPEED PUMP CONTROL

CROSS REFERENCE TO RELATED APPLICATION

This application claims benefit to provisional patent application No. 61/576,737, filed 16 Dec. 2011, which is hereby incorporated by reference in its entirety.

BACKGROUND OF THE INVENTION

1. Field of the Invention

The present invention relates to a technique for controlling the operation of a pump; and more particularly, the present invention relates to a method and apparatus for controlling the speed of a pump, e.g., for domestic and commercial heating or cooling water systems.

2. Brief Description of Related Art

FIG. 1(a) shows a secondary variable speed pump control hydronic heating and cooling system that is known in the art, and FIG. 1(b) shows a water booster pumping system that is also known in the art. Recently, issues regarding energy saving and environmental protection in such pumping systems have been addressed dramatically. Increasing more attention is being paid to hydronic pump control applications, including pump controls for domestic and commercial heating and cooling water pumping or circulating systems, water booster pumping systems, and so forth, like those shown in FIGS. 1(a) and (b) with their characteristics that may be dynamic and unknown in nature. To reduce energy consumption and operation costs, some known adaptive control approaches have been proposed.

For example, U.S. patent application Ser. No. 12/982,286, filed 30 Dec. 2010 (File nos. F-B&G-1001//911-19.001), which is assigned to the assignee of the instant patent application and hereby incorporated by reference in its entirety, discloses an adaptive control scheme for hydronic heating and cooling pumping systems as well as for water booster pumping systems, consistent with that shown in FIGS. 1(a) and (b) schematically. FIG. 1(c) shows a graph having various functions plotted using known system curve equations, e.g., including a pump curve, an instant system curve, a constant control curve, an equivalent system curve (as designed), an adaptive control curve and a distribution loss curve. A pressure set point, $P^*$, with respect to a flow rate requested, $Q^*$, can be calculated and/or determined from the equation of $P^*(t)=(Q^*(t)/\overline{C}_v^a(t))^2+b$, where the adaptive control curve, $\overline{C}_v^a(t)$, may be obtained from the flow equation together with a moving average filter. With this adaptive approach, the adaptive control curve to obtain the pressure set point is much closer to the equivalent system curve which represents the minimum pressure needed to maintain the flow rate requested, consistent with that shown in FIG. 1(c). Because of this, pumping system operation energy may be saved using this adaptive approach.

SUMMARY OF THE INVENTION

The present invention provides an improvement on the adaptive control scheme set forth in the aforementioned U.S. patent application Ser. No. 12/982,286.

According to some embodiments, the present invention may take the form of apparatus, such as a pump controller, featuring a signal processor configured at least to:
- receive signaling containing information about a linear set point control curve based at least partly on an adaptive set point control curve related to fluid being pumped by a pump in a pumping system, and
- determine a control set point based at least partly on the signaling received.

Embodiments of the present invention may also include one or more of the following features:

The signal processor may be configured to provide a control signal containing information to control the pump based at least partly on the control set point determined.

The linear set point control curve is derived from the adaptive set point control curve with respect to system flow and pressure, including being derived by the signal processor.

The signal processor may be configured to determine the linear set point control curve based at least partly on the following equation:

$$P^*(t)=P_0 Q^*(t)/\overline{Q}_{max}+b_0,$$

where $P_0$ is a constant pressure set point,
$Q^*(t)$ is a requested flow rate
$Q_{max}$ is a maximum system flow rate,
$\overline{Q}_{max}$ is a maximum adaptive flow rate, and
$b_0$ is a pressure threshold.

The signal processor may be configured to determine a system flow rate as a summation of each individual zone flow rate, based as least partly on the following equation:

$$Q^*(t) = \sum_{i=1}^{n} Q_i^*(t),$$

where $Q_i^*$ is a flow rate at zone i and n is the total number of zones.

The signal processor may be configured to determine the system flow rate if zone temperature control parameters are used, based at least partly on the following equation:

$$Q^*(t) = \alpha \sum_{i=1}^{n} Q_{i,max}(T_i^*(t) - T_{outdoor})/(T_{i,max} - T_{outdoor}),$$

where $T_i^*$ is a temperature set point for zone i,
$Q_{i,max}$ is a maximum flow rate to obtain a maximum temperature,
$T_{i,max}$ is designated for a zone i,
$T_{outdoor}$ is the outdoor temperature, and
$\alpha$ is a compensate coefficient.

The signal processor may be configured to determine a requested flow rate $Q^*(t)$ based at least partly on the following equation:

$$Q^*(t) = (1-r)C_v^2(t)/\overline{C}_v^m(t)\left(1 + \sqrt{1 + 4r(C_v(t)/\overline{C}_v^m(t))^2/(1-r)^2}\right)\sqrt{P_0}/2,$$

where $r=b_0/P_0$,
$C_v(t)$ is an instant system curve,
$\overline{C}_v^a(t)=MA(Q(t)/\sqrt{P(t)})$ is the adaptive set point control curve, $\overline{Q}_{max}$ is an adaptive maximum flow,
$\overline{C}_v^m(t)$ is a corresponding maximum system curve, and
$P_0$ is a constant pressure set point.

The signal processor is configured to determine a pressure set point from the adaptive control curve directly based at least partly on the following equation:

$$P^*(t)=(Q^*(t)/\overline{C}_v^a(t))^2.$$

The signal processor may be configured to determine the control set point based at least partly on the requested flow rate $Q^*$ and derived from the adaptive set point control curve.

The apparatus may further include at least one memory including computer program code; and the at least one memory and computer program code are configured to, with at least one processor, cause the apparatus at least to:
receive the signaling; and
determine the control set point based at least partly on the signaling received.

The apparatus may include, or take the form of, a pump control or controller, including a PID control, having the one signal processor.

According to some embodiments, the present invention may takes the form of a method including steps for receiving in the signal processor signaling containing information about the linear set point control curve based at least partly on the adaptive set point control curve related to fluid being pumped by the pump in the pumping system, and determining in the signal processor the control set point based at least partly on the signaling received.

The present invention may also, e.g., take the form of a computer program product having a computer readable medium with a computer executable code embedded therein for implementing the method, e.g., when run on a signaling processing device that forms part of such a pump controller. By way of example, the computer program product may, e.g., take the form of a CD, a floppy disk, a memory stick, a memory card, as well as other types or kind of memory devices that may store such a computer executable code on such a computer readable medium either now known or later developed in the future.

One advantage of the present invention is that it can contribute to the overall reduction of energy consumption and operation costs, including, e.g., the secondary variable speed pump control hydronic heating and cooling system shown in FIG. 1(a) and the water booster pumping system shown in FIG. 1(b).

BRIEF DESCRIPTION OF THE DRAWING

The drawing includes the following Figures, not drawn to scale:

FIG. 1 includes FIGS. 1a, 1b and 1c, where FIG. 1a is a diagram of a secondary variable speed pump control hydronic heating or cooling system that is known in the art; where FIG. 1b is a diagram of a water booster pumping system that is known in the art; and FIG. 1c is a graph of flow (GPM) in relation to foot head pressure for implementing an adaptive control technique based on an adaptive control curve in which the hydronic power saved=dP*Q* at a flow rate of Q*, consistent with that known in the art.

FIG. 2 is a block diagram of apparatus according to some embodiments of the present invention.

FIG. 3 is a graph of is a graph of system pressure in relation to flow (GPM) for implementing an adaptive control technique based on a linear set point curve derived from adaptive and constant control curves, according to some embodiments of the present invention.

FIG. 4 is a graph of is a graph of system pressure in relation to flow (GPM) for implementing a linear adaptive control technique based on determining a request flow Q*, according to some embodiments of the present invention.

DETAILED DESCRIPTION OF THE INVENTION

FIG. 2 shows the present invention in the form of apparatus 10, such as a pump controller, featuring a signal processor 12 configured at least to receive signaling containing information about a linear set point control curve based at least partly on an adaptive set point control curve related to fluid being pumped by a pump in a pumping system, and determine a control set point based at least partly on the signaling received. The signal processor 12 may also be configured to provide a control signal containing information to control the pump based at least partly on the control set point determined. The apparatus 10 may include, or take the form of, a pump control or controller, including a PID control, having the signal processor 12.

FIG. 3

FIG. 3 shows a graph having various functions plotted using known system curve equations, e.g., including a pump curve, a constant control curve, a dynamic linear control curve, an equivalent system curve, an adaptive control curve and a distribution loss curve. In the adaptive approach according to that set forth in FIG. 3, the control set point is obtained from, and based at least partly on, a linear set point curve derived from the adaptive and constant control curve.

In operation, according to some embodiments of the present invention, the dynamic linear control curve may be derived from the adaptive control curve with respect to system flow and pressure, consistent with that shown in FIG. 3. By using this adaptive approach, the pressure set point P* may be obtained easily. Most importantly, it makes an adaptive pump control means achievable for a system configuration without a need to have all zone flow rate signals available specially.

By way of example, following the linear adaptive approach, the set point curve with respect to a flow rate requested at any time t can be written as $$P^*(t)=P_0 \cdot Q^*(t)/\overline{Q}_{max}+b_0, \quad (1)$$

where $P_0$ is the constant pressure set point, $Q_{max}$ is the maximum system flow rate, $\overline{Q}_{max}$ is the maximum adaptive flow rate, $b_0$ is a pressure threshold, and $\overline{C}_v^a(t)=MA(Q(t)/\sqrt{P(t)})$ is the adaptive control curve, consistent with that set forth in the aforementioned U.S. patent application Ser. No. 12/982,286. $\overline{Q}_{max}$ can be obtained directly through a moving average filter or through a moving peak detector, preferably upon the instant system characteristics.

The adaptive technique herein can be used to trace any varying or unknown system characteristics and to set up the control set point accordingly when the flow rate of Q*(t) is known. In this case, the system flow rate can be expressed as the summation of each individual zone flow rate approximately as $$Q^*(t) = \sum_{i=1}^{n} Q_i^*(t), \quad (2)$$

where $Q_i^*(t)$ is the flow rate at zone i and n is the total number of zones.

If the zone temperature control parameters are used, Eq. (2) may be rewritten as $$Q^*(t) = \alpha \sum_{i=1}^{n} Q_{i,max}(T_i^*(t) - T_{outdoor})/(T_{i,max} - T_{outdoor}), \quad (3)$$

where $T_i^*$ is the temperature set point for zone i, $Q_{i,max}$ is the maximum flow rate to obtain the maximum temperature $T_{i,max}$ designated for zone i, $T_{outdoor}$ is outdoor temperature, and $\alpha$ is a compensate coefficient. $T_i^*$ may be the water temperature set point leaving water heating or cooling exchanger coils or the temperature set point on the thermostat for circulator or control valve signals, respectively.

According to some embodiments of the present invention, control curves and means for hydronic pumping systems set forth herein may include using such a dynamic linear set point curve in FIG. 3 and its corresponding expression in Eq. (1) with respect to system flow and pressure respectively. Here, the system flow rate at any time t can be expressed in forms of the summation of zone flow rates, Eq. (2), or zone temperatures, Eq. (3), which are requested and known.

FIG. 4

FIG. 4 shows a graph having various functions plotted using known system curve equations, e.g., including a pump curve, a constant control curve, a linear adaptive control curve, an instant system curve, an equivalent system curve, an adaptive control curve and a distribution loss curve. In the adaptive approach according to that set forth in FIG. 4, the requested flow rate, Q*, is calculated or determined specially.

In many hydronic systems and applications, however, the zone flow rate signals or zone temperature signals in Eqs. (2) and (3) are not always available or are too expensive to be obtained. For these types of scenarios, an alternative version of the linear adaptive control means is set forth consistent with that shown in FIG. 4 schematically. In this adaptive approach, according to some embodiments of the present invention, the system flow rate requested, Q*, may be calculated and/or determined from the intersection of the instant system curve and the linear adaptive curve, while the pressure set point can then be obtained from the adaptive control curve based on the requested flow rate Q* accordingly.

By following this approach, the flow rate requested, Q*, can be derived as $$Q^*(t) = \qquad (4)$$
$$(1-r)C_v^2(t)/\overline{C}_v^m(t)\left(1 + \sqrt{1 + 4r(C_v(t)/\overline{C}_v^m(t))^2/(1-r)^2}\right)\sqrt{P_0}/2,$$

and the pressure set point may be derived from the adaptive control curve directly as $$P^*(t) = (Q^*(t)/\overline{C}_v^a(t))^2, \quad (5)$$

where $r = b_0/P_0$, $C_v(t)$ is the instant system curve, $\overline{Q}_{max}$ is the adaptive maximum flow, and $\overline{C}_v^m(t)$ is the corresponding maximum system curve. Here, the adaptive control curve may be obtained from a moving average filter or a moving peak detector upon the flow informative equation. Preferably, $\overline{Q}_{max}$ or $\overline{C}_v^m(t)$ may be obtained by using a moving peak detector. Equation (5) together with (4) may be used to set up the control pressure set point in any hydronic system with zones flow rates regulated by control valves primarily, since the system characteristics is utilized to obtain the flow rate requested.

To obtain the instant system curve $C_v(t)$ by using the flow equation, both the instant system pressure and flow rate may need to be known. In many practice applications, the system flow rate may not be always available. For that, one of those motor operation parameters, such as speed, torque, power or current ratings, may be utilized to calculate the flow rate with a linear approximation alternatively. If available, a sensorless inverter which yields the system flow rate and pressure from motor speed and power based on pump and system calibration data may be used as well.

To apply the control pressure set point models proposed herein in a control system, the certain amount of sensors monitoring and signaling, transmitting and wiring technologies may need to be provided. Among those, the wireless sensor signals transmission technologies or sensorless pump control technologies may provide some optimal and better solutions.

In effect, according to some embodiments of the present invention, control curves and means for hydronic pumping systems mentioned herein may include such using dynamic linear set point curves in FIG. 4 and its corresponding expressions in Eqs. (4) and (5) respectively. Here, the system flow rate requested may be calculated and/or determined by using Eqs. (4) and (5), when the zone flow rate or zone temperature signals are not available. In cases where the system flow rate is not available, one of the motor operation parameters including speed, torque, power or current ratings may be utilized to calculate the flow rate with a linear approximation alternatively. If available, a sensorless inverter which yields the system flow rate and pressure from motor speed and power based on pump and system calibration data may be used as well.

In general, by using the linear adaptive control means according to the present invention, the pump operations energy can be saved significantly. The methods are simple, feasible, and can be integrated easily into any pump control hydronic system including close loop heating and cooling control systems as well as open loop water booster pumping systems.

The Apparatus 10

By way of example, the functionality of the apparatus 10 may be implemented using hardware, software, firmware, or a combination thereof. In a typical software implementation, the apparatus 10 would include one or more microprocessor-based architectures having, e.g., at least one signal processor or microprocessor like element 12. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the processors 12 as stand-alone processor or processor module, as separate processor or processor modules, as well as some combination thereof.

The apparatus may also include other signal processor circuits or components 14, e.g. including random access memory (RAM) and/or read only memory (ROM) like element 14, input/output devices and control, and data and address buses connecting the same, and/or at least one input processor and at least one output processor.

Possible Additional Applications

Consistent with that disclosed herein, the control means for heating or cooling water systems as well as pressure booster systems may include the dynamic linear set point curves and means. With the new approaches, the control curve is much closer to the system curve and the operation energy cost on pump control may be reduced significantly.

Consistent with that disclosed herein, the hydronic systems mentioned herein may include primary pumping systems, secondary pumping systems, water circulating systems, and pressure booster systems. The systems mentioned herein may also consist of a single zone or multiple zones.

Consistent with that disclosed herein, the systems mentioned above may include manual or automatic control valves, manual or automatic control circulators, or their combinations.

Consistent with that disclosed herein, the input processing control signals for pumps control may include system pressure or differential pressure, zone pressures or differential pressures, system flow rate or zone flow rates. The other input process signals may also include power, torque, motor speed, and so forth.

Consistent with that disclosed herein, the control signals generating and monitoring, transmitting and wiring technologies may include all conventional sensing and transmitting means that are used currently. Preferably, sensorless pump control technologies as well as wireless sensor signals transmission technologies may provide optimal and favorable solutions.

Consistent with that disclosed herein, the pumps mentioned here for hydronic pumping systems may include a single pump, a group of parallel ganged pumps, a group of serial ganged pumps, or their combinations.

Consistent with that disclosed herein, the pumps staging/destaging as well as alternating means may include all conventional means that are used currently.

An Example of an Adaptive Control Curve

Consistent with that set forth in the aforementioned U.S. patent application Ser. No. 12/982,286, and by way of example, a person skilled in the art would appreciate and understand that an adaptive control curve, $SAMA_t$, can be obtained from instant pressure and flow rate signals through an adaptive moving average filter based at least partly on a system flow equation in a self-calibrating manner as follows:

$$SAMA_t = AMAF(\sqrt{\Delta P_t}/Q_t), \quad (1)$$

where the function AMAF is an adaptive moving average filter function, and the parameters Q and ΔP are instant system flow rate and differential pressure respectively.

In the aforementioned U.S. patent application Ser. No. 12/982,286, a control pressure set point was obtained from the adaptive control curve with respect to the instant flow rate or a moving average flow rate as $$SP_t = MA(Q_t) * SAMA_t + b, \quad (2)$$

where the function MA is a moving average filter function (MA) and the parameter b is a small constant pressure offset. Noted that the function AMAF could also be replaced by a moving average filter function (MA) or any other similar adaptive filters, respectively, either now known or later developed in the future. The scope of the invention is not intended to be limited to the type or kind of filter function. The adaptive control curves and technique for pump control for domestic and commercial heating or cooling water systems may also include a threshold at the beginning of the control curve for accommodating pump minimum speed.

For a system with arbitrary distribution characteristics of which the differential pressure P(x,t) is a function of flow rate Q(x,t) with flow rate percentage x and time t, the adaptive control curve and the set point may then be rewritten as follows:

$$SAMA_{x,t} = AMAF(\sqrt{\Delta P_{x,t}}/Q_{x,t}), \quad (3)$$

and $$SP_{x,t} = MA(Q_{x,t}) * SAMA_{x,t} + b. \quad (4)$$

Here, the function AMAF is a 2D adaptive moving average filter with respect to an instant system flow rate percentage x and time t, respectively.

Techniques for Deriving One Equation from Another Equation

Techniques for deriving one equation from another equation, e.g., such as deriving the linear set point curve from the adaptive and constant control curve as set forth herein, are known in the art, and the scope of the invention is not intended to be limited to any particular type kind or way of technique, or any particular way of doing so, either now known or later developed in the future.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. A pump controller for providing an adaptive pump control to reduce energy consumption and operating cost of a heating and water cooling system, comprising:
    a signal processor configured at least to:
        receive signaling containing information about a linear set point control curve derived from adaptive and constant set point control curves related to fluid being pumped by a pump in a pumping system, and
        determine corresponding signal containing information about a control set point to control and vary adaptively the speed of the pump in the pumping system using an adaptive control algorithm that obtains the control set point from the linear set point control curve derived, based at least partly on the signaling received.

2. The pump controller according to claim 1, wherein the signal processor is configured to provide the corresponding signaling as a control signal containing information to control the pump based at least partly on the control set point determined.

3. The pump controller according to claim 1, wherein the linear set point control curve is derived from the adaptive set point control curve with respect to system flow and pressure, including being derived from by the signal processor.

4. The pump controller according to claim 1, wherein the signal processor is configured to determine a pressure set point $P^*(t)$ with respect to a requested flow rate $Q^*(t)$ using the linear set point control curve based at least partly on the following equation:

$$P^*(t)=P_0 Q^*(t)/\overline{Q}_{max}+b_0,$$

where $P_0$ is a constant pressure set point,
$Q^*(t)$ is a requested flow rate
$Q_{max}$ is a maximum system flow rate,
$\overline{Q}_{max}$ is a maximum adaptive flow rate, and
$b_0$ is a pressure threshold.

5. The pump controller according to claim 4, wherein the signal processor is configured to determine a system flow rate as a summation of each individual zone flow rate, based as least partly on the following equation:

$$Q^*(t) = \sum_{i=1}^{n} Q_i^*(t),$$

where $Q_i^*$ is a flow rate at zone i and n is the total number of zones.

6. The pump controller according to claim 5, wherein the signal processor is configured to determine the system flow rate if zone temperature control parameters are used, based at least partly on the following equation:

$$Q^*(t) = \alpha \sum_{i=1}^{n} Q_{i,max}(T_i^*(t) - T_{outdoor})/(T_{i,max} - T_{outdoor}),$$

where $T_i^*$ is a temperature set point for zone i,
$Q_{i,max}$ is a maximum flow rate to obtain a maximum temperature,
$T_{i,max}$ is designated for a zone i,
$T_{outdoor}$ is the outdoor temperature, and
$\alpha$ is a compensate coefficient.

7. The pump controller according to claim 1, wherein the signal processor is configured to determine a requested flow rate $Q^*$ (t) based at least partly on the following equation:

$$Q^*(t) = (1-r)C_v^2(t)/\overline{C}_v^m(t)\left(1 + \sqrt{1 + 4r(C_v(t)/\overline{C}_v^m(t))^2/(1-r)^2}\right)\sqrt{P_0}/2,$$

where $r=b_0/P_0$,
$C_v(t)$ is an instant system curve,
$\overline{C}_v^a(t)=MA(Q(t)/\sqrt{P(t)})$ is the adaptive set point control curve,
$\overline{Q}_{max}$ is an adaptive maximum flow,
$\overline{C}_v^m(t)$ is a corresponding maximum system curve, and
$P_0$ is a constant pressure set point.

8. The pump controller according to claim 7, wherein the signal processor is configured to determine a pressure set point from the adaptive set point control curve directly based at least partly on the following equation:

$$P^*(t)=(Q^*(t)/\overline{C}_v^a(t))^2.$$

9. The pump controller according to claim 1, wherein the signal processor is configured to determine the control set point based at least partly on a requested flow rate $Q^*(t)$ and derived from the adaptive set point control curve.

10. The pump controller according to claim 1, wherein the pump controller further comprises at least one memory including computer program code; and the at least one memory and computer program code are configured to, with at least one processor, cause the pump controller at least to:
receive the signaling; and
determine the control set point based at least partly on the signaling received.

11. The pump controller according to claim 1, wherein the pump controller may include, or take the form of, a PID control, having the signal processor.

12. A method for using a pump controller for providing an adaptive pump control to reduce energy consumption and operating cost of a heating and water cooling system, comprising:
receiving in a pump controller having a signal processor signaling containing information about a linear set point control curve derived from adaptive set point and constant control curve related to fluid being pumped by a pump in a pumping system, and
determining in the pump controller corresponding signaling containing information about a control set point to control and vary adaptively the speed of the pump in the pumping system using an adaptive control algorithm that obtains the control set point from the linear set point control curve derived, based at least partly on the signaling received.

13. The method according to claim 12, wherein the method comprises providing with the signal processor the corresponding signaling as a control signal containing information to control the pump based at least partly on the control set point determined.

14. A method according to claim 12, wherein the method comprises determining with the signal processor a requested flow rate $Q^*$ based at least partly on the signaling containing information about an intersection point between the linear set point control curve and the adaptive set point control curve, including the intersection point at a maximum adaptive flow rate, $\overline{Q}_{max}$.

15. The method according to claim 12, wherein the method comprises determining with the signal processor the linear set point control curve based at least partly on the following equation:

$$P^*(t)=P_0 Q^*(t)/\overline{Q}_{max}+b_0,$$

where $P_0$ is a constant pressure set point,
$Q^*(t)$ is a requested flow rate
$Q_{max}$ is a maximum system flow rate,
$\overline{Q}_{max}$ is a maximum adaptive flow rate, and
$b_0$ is a pressure threshold.

16. The method according to claim 15, wherein the method comprises determining with the signal processor a system flow rate as a summation of each individual zone flow rate, based as least partly on the following equation:

$$Q^*(t) = \sum_{i=1}^{n} Q_i^*(t),$$

where $Q_i^*(t)$ is a flow rate at zone i and n is the total number of zones.

17. The method according to claim 16, wherein the method comprises determining with the signal processor the system flow rate if zone temperature control parameters are used, based at least partly on the following equation:

$$Q^*(t) = \alpha \sum_{i=1}^{n} Q_{i,max}(T_i^*(t) - T_{outdoor})/(T_{i,max} - T_{outdoor}),$$

where $T_i^*$ is a temperature set point for zone i,
$Q_{i,max}$ is a maximum flow rate to obtain a maximum temperature,
$T_{i,max}$ is designated for a zone i,
$T_{outdoor}$ is the outdoor temperature, and
$\alpha$ is a compensate coefficient.

18. The method according to claim 12, wherein the method comprises determining with the signal processor a requested flow rate $Q^*(t)$ based at least partly on the following equation:

$$Q^*(t) = (1-r)C_v^2(t)/\overline{C}_v^m(t)\left(1 + \sqrt{1 + 4r(C_v(t)/\overline{C}_v^m(t))^2/(1-r)^2}\right)\sqrt{P_0}/2,$$

where $r = b_0/P_0$,
$C_v(t)$ is an instant system curve,
$\overline{C}_v^a(t) = MA(Q(t)/\sqrt{P(t)})$ is the adaptive set point control curve,
$\overline{Q}_{max}$ is an adaptive maximum flow,
$\overline{C}_v^m(t)$ is a corresponding maximum system curve, and
$P_0$ is a constant pressure set point.

19. The method according to claim 18, wherein the signal processor is configured to determine a pressure set point from the adaptive control curve directly based at least partly on the following equation:

$$P^*(t) = (Q^*(t)/\overline{C}_v^a(t))^2.$$

20. The method according to claim 12, wherein the method comprises determining with the processor the control set point based at least partly on the requested flow rate $Q^*(t)$ and derived from the adaptive set point control curve.

21. The method according to claim 12, wherein the method comprises configuring the signal processor with at least one memory including computer program code; and causing the signal processor and at least one memory at least to:
  receive the signaling; and
  determine the control set point based at least partly on the signaling received.

22. A pump controller for providing an adaptive pump control to reduce energy consumption and operating cost of a heating and water cooling system, comprising:
  means for receiving signaling containing information about a linear set point control curve derived from adaptive and constant set point control curves related to fluid being pumped by a pump in a pumping system, and
  means for determining corresponding signaling containing information about a control set point to control and vary adaptively the speed of the pump in the pumping system using an adaptive control algorithm that obtains the control set point from the linear set point control curve derived, based at least partly on the signaling received.

23. The pump controller according to claim 22, wherein the pump controller further comprises means for providing the corresponding signaling as a control signal containing information to control the pump based at least partly on the control set point determined.

24. The pump controller for according to claim 22, wherein the means for determining determines a requested flow rate $Q^*$ based at least partly on the signaling containing information about an intersection point between the linear set point control curve and the adaptive set point control curve, including the intersection point at a maximum adaptive flow rate, $\overline{Q}_{max}$.

* * * * *